United States Patent
Lee et al.

(10) Patent No.: US 11,076,446 B2
(45) Date of Patent: Jul. 27, 2021

(54) METHOD AND APPARATUS FOR SELECTING A RELAY USER EQUIPMENT

(71) Applicant: LG ELECTRONICS INC., Seoul (KR)

(72) Inventors: Ki-Dong Lee, Seoul (KR); Sang Gook Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/499,845

(22) PCT Filed: Mar. 30, 2018

(86) PCT No.: PCT/KR2018/003819
§ 371 (c)(1),
(2) Date: Sep. 30, 2019

(87) PCT Pub. No.: WO2018/182373
PCT Pub. Date: Oct. 4, 2018

(65) Prior Publication Data
US 2020/0107397 A1 Apr. 2, 2020

Related U.S. Application Data

(60) Provisional application No. 62/479,255, filed on Mar. 30, 2017.

(51) Int. Cl.
*H04W 88/04* (2009.01)
*H04W 40/22* (2009.01)
(Continued)

(52) U.S. Cl.
CPC ........... *H04W 88/04* (2013.01); *H04W 40/22* (2013.01); *H04W 76/14* (2018.02); *H04W 76/27* (2018.02)

(58) Field of Classification Search
CPC ..... H04W 88/04; H04W 40/22; H04W 76/27; H04W 76/14
See application file for complete search history.

(56) References Cited

U.S. PATENT DOCUMENTS 7,724,665 B2 * 5/2010 Tanaka .................... H04L 47/11
370/235
8,886,238 B2 * 11/2014 Chun .................... H04L 5/0091
455/509

(Continued)

FOREIGN PATENT DOCUMENTS

KR 1020160034233 3/2016
WO 2016160278 10/2016

(Continued)

OTHER PUBLICATIONS

PCT International Application No. PCT/KR2018/003819, Notification of Transmittal of the International Search Report and the Written Opinion of the International Searching Authority, or Declaration dated Sep. 6, 2018, 10 pages.

*Primary Examiner* — Yemane Mesfin
*Assistant Examiner* — Henry Baron
(74) *Attorney, Agent, or Firm* — Lee Hong Degerman Kang Waimey

(57) ABSTRACT

The present invention is directed to a method and an apparatus for use in a wireless communication system. Specifically, the present invention is directed to a method comprising: receiving a plurality of first battery status information from a plurality of Relay UEs, wherein each first battery status information includes an estimated time length of residual battery life of a respective Relay UE; if a congestion is recognized, transmitting a first request signal for requesting additional information about battery status to the plurality of Relay UEs; as a response to the first request signal, receiving a plurality of second battery status infor- (Continued)

mation from the plurality of Relay UEs, wherein each second battery status information includes a charging status of a respective Relay UE; and selecting one of the plurality of Relay UEs based on the first and second battery status information, and an apparatus therefore. A UE is capable of communicating with at least one of another UE, a UE related to an autonomous driving vehicle, a base station or a network.

9 Claims, 14 Drawing Sheets

(51) Int. Cl.
*H04W 76/14* (2018.01)
*H04W 76/27* (2018.01)

(56) References Cited

U.S. PATENT DOCUMENTS

2016/0088668 A1* 3/2016 Kim .................. H04W 4/70
                                                    370/315
2018/0279110 A1* 9/2018 Sen .................. H04W 8/005

FOREIGN PATENT DOCUMENTS

| WO | 2016163745 | 10/2016 |
| WO | 2016182597 | 11/2016 |
| WO | 2017017887 | 2/2017 |

* cited by examiner

FIG. 3
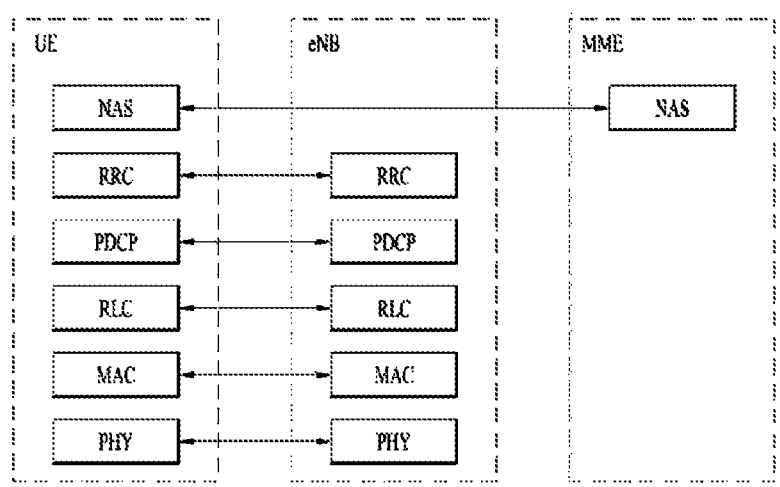
(a) Control-Plane Protocol Stack
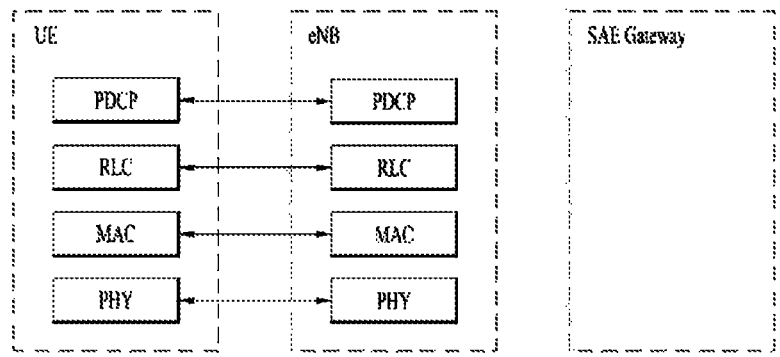
(b) User-Plane Protocol Stack

METHOD AND APPARATUS FOR SELECTING A RELAY USER EQUIPMENT

CROSS-REFERENCE TO RELATED APPLICATIONS

This application is the National Stage filing under 35 U.S.C. 371 of International Application No. PCT/KR2018/003819, filed on Mar. 30, 2018, which claims the benefit of U.S. Provisional Application No. 62/479,255, filed on Mar. 30, 2017, the contents of which are all hereby incorporated by reference herein in their entirety.

TECHNICAL FIELD

The present invention is directed to a method and an apparatus for use in a wireless communication system. Specifically, the present invention is directed to a method and an apparatus of selecting a relay user equipment.

BACKGROUND ART

Generally, a wireless communication system is being developed to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, a Multi Carrier Frequency Division Multiple Access (MC-FDMA) and the like.

DISCLOSURE

Technical Problem

An object of the present invention is to provide a method and an apparatus of efficiently selecting a relay user equipment.

It will be appreciated by persons skilled in the art that the objects that can be achieved through the present invention are not limited to what has been particularly described hereinabove and the above and other objects that the present invention can achieve will be more clearly understood from the following detailed description taken in conjunction with the accompanying drawings.

Technical Solution

As an aspect of the invention, a method for a User Equipment (UE) to select a Relay UE in a cellular communication system is provided, wherein the method comprises: receiving a plurality of first battery status information from a plurality of Relay UEs, wherein each first battery status information includes an estimated time length of residual battery life of a respective Relay UE; if a congestion is recognized, transmitting a first request signal for requesting additional information about battery status to the plurality of Relay UEs; as a response to the first request signal, receiving a plurality of second battery status information from the plurality of Relay UEs, wherein each second battery status information includes a charging status of a respective Relay UE; and selecting one of the plurality of Relay UEs based on the first and second battery status information.

As another aspect of the invention, a User Equipment (UE) configured to select a Relay UE in a wireless communication system is provided, wherein the UE comprises: a radio frequency (RF) unit; and a processor, wherein the processor is configured to: receive a plurality of first battery status information from a plurality of Relay UEs, wherein each first battery status information includes an estimated time length of residual battery life of a respective Relay UE, if a congestion is recognized, transmit a first request signal for requesting additional information about battery status to the plurality of Relay UEs, as a response to the first request signal, receive a plurality of second battery status information from the plurality of Relay UEs, wherein each second battery status information includes a charging status of a respective Relay UE, and select one of the plurality of Relay UEs based on the first and second battery status information.

Preferably, the congestion may be recognized if a congestion level received from system information is higher than a threshold value.

Preferably, the congestion may be recognized if a number of busy channels monitored in a time interval exceeds p % of a total number of channel in the time interval, and p is a pre-determined value.

Preferably, the aspects may further comprise: transmitting a second request signal for requesting additional information about battery status to the plurality of Relay UEs; and as a response to the second request signal, receiving a plurality of third battery status information from the plurality of Relay UEs, wherein each third battery status information includes a changing speed of charging status of a respective Relay UE.

Preferably, the first request signal and the second request signals may be distinguished using scrambling sequences initialized with different common identifier.

Preferably, if the congestion is not recognized, the one of the plurality of Relay UEs is selected only based on the first battery status information, without requesting the additional information about battery status to the plurality of Relay UEs.

Advantageous Effects

Exemplary embodiments of the present invention have the following effects. In accordance with the embodiments of the present invention, a relay user equipment selection can be efficiently performed.

It will be appreciated by persons skilled in the art that the effects that can be achieved through the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 3 is a diagram showing a control plane and a user plane of a radio interface protocol between a UE and an E-UTRAN based on a 3rd generation partnership project (3GPP) radio access network standard;

MODE FOR INVENTION

Reference will now be made in detail to the preferred embodiments of the present invention with reference to the accompanying drawings. The detailed description, which will be given below Referring to the accompanying drawings, is intended to explain exemplary embodiments of the present invention, rather than to show the only embodiments that can be implemented according to the invention. The following embodiments of the present invention can be applied to a variety of wireless access technologies, for example, CDMA, FDMA, TDMA, OFDMA, SC-FDMA, MC-FDMA, and the like. CDMA can be implemented by wireless communication technologies, such as Universal Terrestrial Radio Access (UTRA) or CDMA2000. TDMA can be implemented by wireless communication technologies, for example, Global System for Mobile communications (GSM), General Packet Radio Service (GPRS), Enhanced Data rates for GSM Evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. UTRA is a part of the Universal Mobile Telecommunications System (UMTS). 3rd Generation Partnership Project (3GPP) Long Term Evolution (LTE) is a part of Evolved UMTS (E-UMTS) that uses E-UTRA. The LTE-Advanced (LTE-A) is an evolved version of 3GPP LTE.

Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto. Specific terms used for the exemplary embodiments of the present invention are provided to aid in understanding of the present invention. These specific terms may be replaced with other terms within the scope and spirit of the present invention.

Figure 1:
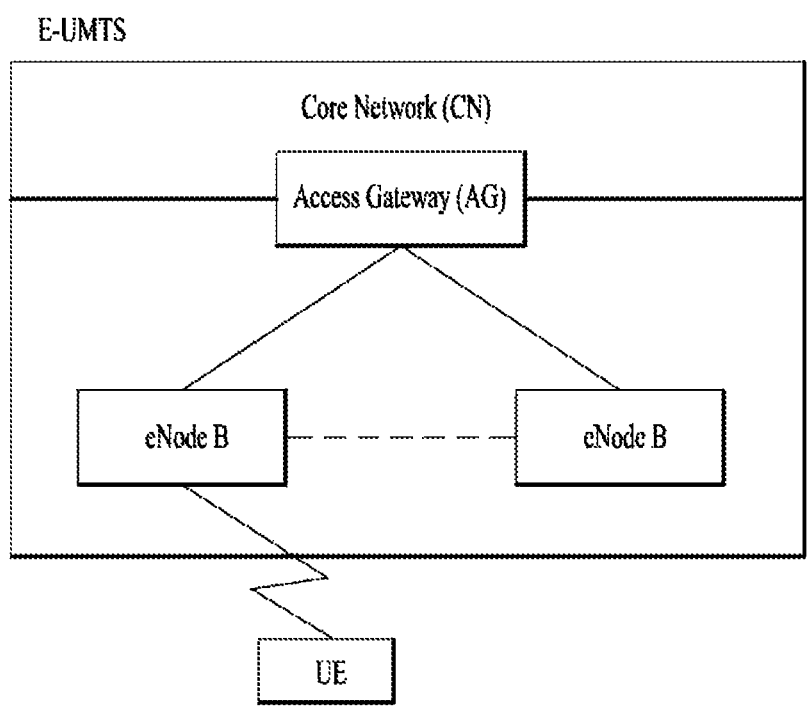
FIG. 1 is a diagram showing a network structure of an Evolved Universal Mobile Telecommunications System (E-UMTS) as an example of a wireless communication system.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. Details of the technical specifications of UMTS and E-UMTS are provided in Release 7 and Release 8 of "3rd Generation Partnership Project; Technical Specification Group Radio Access Network", for example.

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Device to device (D2D) communication refers to the distributed communication technology that directly transfers traffic between adjacent nodes without using infrastructure such as a base station. In a D2D communication environment, each node such as a portable terminal discovers user equipment physically adjacent thereto and transmits traffic after setting communication session. In this way, since D2D communication may solve traffic overload by distributing traffic concentrated into the base station, the D2D communication may have received attention as the element technology of the next generation mobile communication technology after 4G. For this reason, standard institutes such as 3GPP or IEEE have proceeded to establish a D2D communication standard on the basis of LTE-A or Wi-Fi, and Qualcomm has developed their own D2D communication technology.

It is expected that D2D communication contributes to increase throughput of a mobile communication system and create new communication services. Also, D2D communication may support proximity based social network services or network game services. The problem of link of a user equipment located at a shade zone may be solved by using a D2D link as a relay. In this way, it is expected that the D2D technology will provide new services in various fields.

D2D communication technologies such as infrared communication, ZigBee, radio frequency identification (RFID) and near field communications (NFC) based on RFID have been already used. However, since these technologies support communication only of a specific object within a limited distance (about 1 m), it is difficult for the technologies to be strictly regarded as D2D communication technologies.

Although D2D communication has been described as above, details of a method for transmitting data from a plurality of D2D user equipments with the same resource have not been suggested.

Figure 2A:
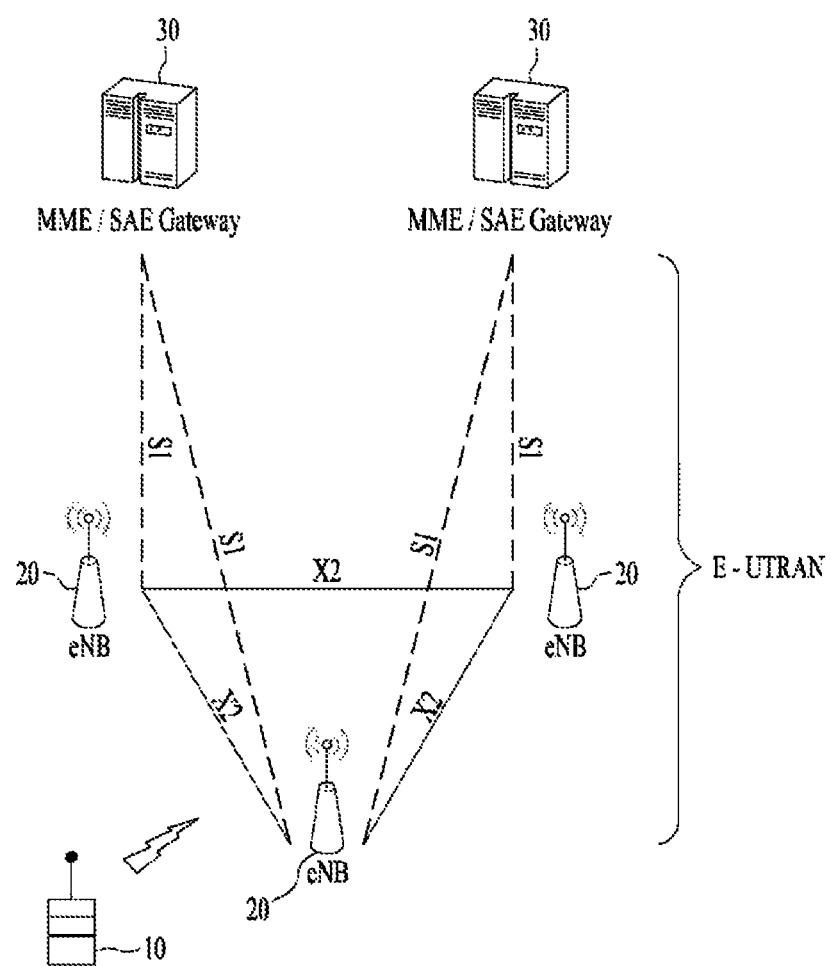
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
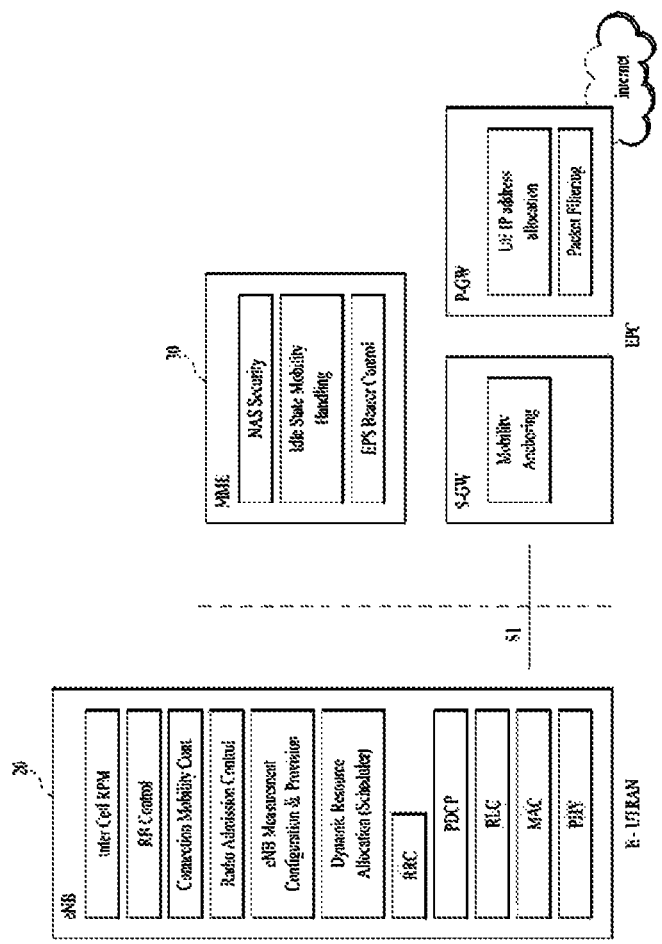
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an Si interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeB s 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel Data is transported between the MAC layer and the PHY layer via the transport channel Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
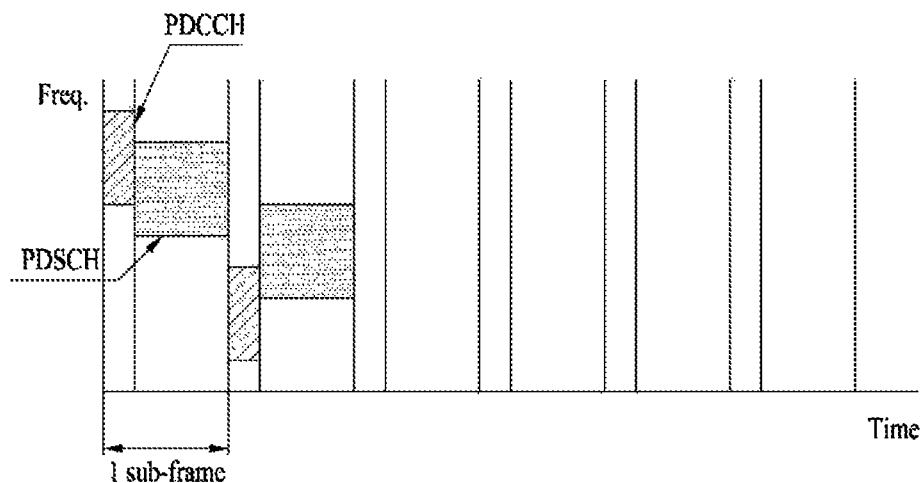
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 MS.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Recently, Proximity-based Service (ProSe) has been discussed in 3GPP. The ProSe enables different UEs to be connected (directly) each other (after appropriate procedure(s), such as authentication), through eNB only (but not further through Serving Gateway (SGW)/Packet Data Network Gateway (PDN-GW, PGW)), or through SGW/PGW. Thus, using the ProSe, device to device direct communication can be provided, and it is expected that every devices will be connected with ubiquitous connectivity. Direct communication between devices in a near distance can lessen the load of network. Recently, proximity-based social network services have come to public attention, and new kinds of proximity-based applications can be emerged and may create new business market and revenue. For the first step, public safety and critical communication are required in the market. Group communication is also one of key components in the public safety system. Required functionalities are: Discovery based on proximity, Direct path communication, and Management of group communications.

Use cases and scenarios are for example: i) Commercial/social use, ii) Network offloading, iii) Public Safety, iv) Integration of current infrastructure services, to assure the consistency of the user experience including reachability and mobility aspects, and v) Public Safety, in case of absence of EUTRAN coverage (subject to regional regulation and operator policy, and limited to specific public-safety designated frequency bands and terminals).

Figure 5:
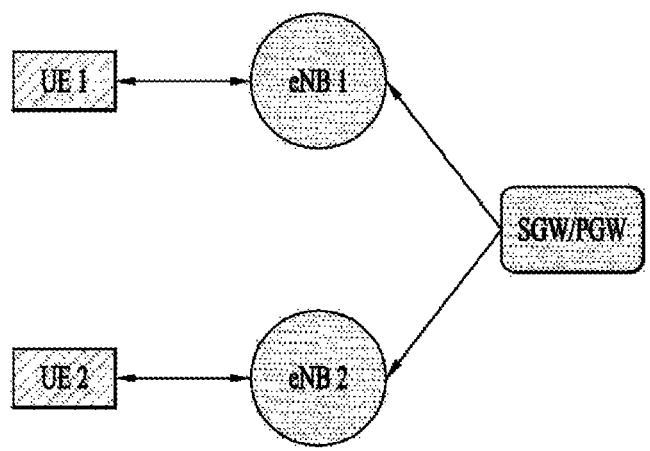
FIG. 5 is an example of default data path for a normal communication.

FIG. 5 is an example of default data path for communication between two UEs. With reference to FIG. 5, even when two UEs (e.g., UE1, UE2) in close proximity communicate with each other, their data path (user plane) goes via the operator network. Thus a typical data path for the communication involves eNB(s) and/or Gateway(s) (GW(s)) (e.g., SGW/PGW).

Figure 6:
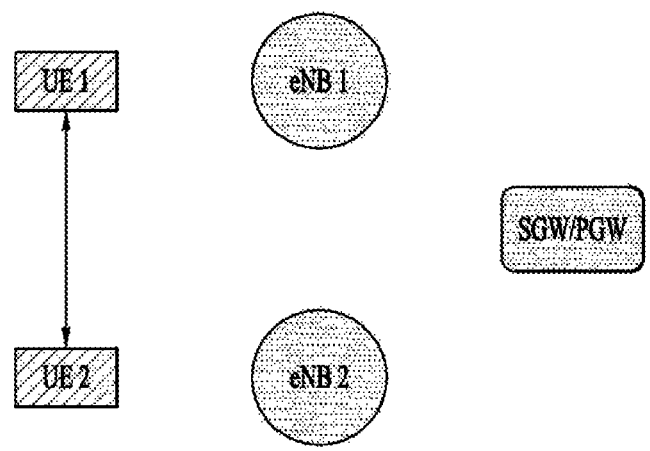
FIGS. 6 and 7 are examples of data path scenarios for a proximity communication.
Figure 7:
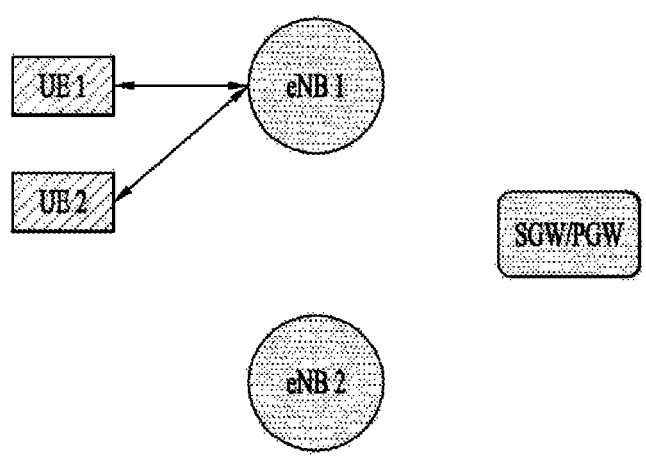

FIGS. 6 and 7 are examples of data path scenarios for a proximity communication. If wireless devices (e.g., UE1, UE2) are in proximity of each other, they may be able to use a direct mode data path (FIG. 6) or a locally routed data path (FIG. 7). In the direct mode data path, wireless devices are connected directly each other (after appropriate procedure(s), such as authentication), without eNB and SGW/PGW. In the locally routed data path, wireless devices are connected each other through eNB only.

Figure 8:
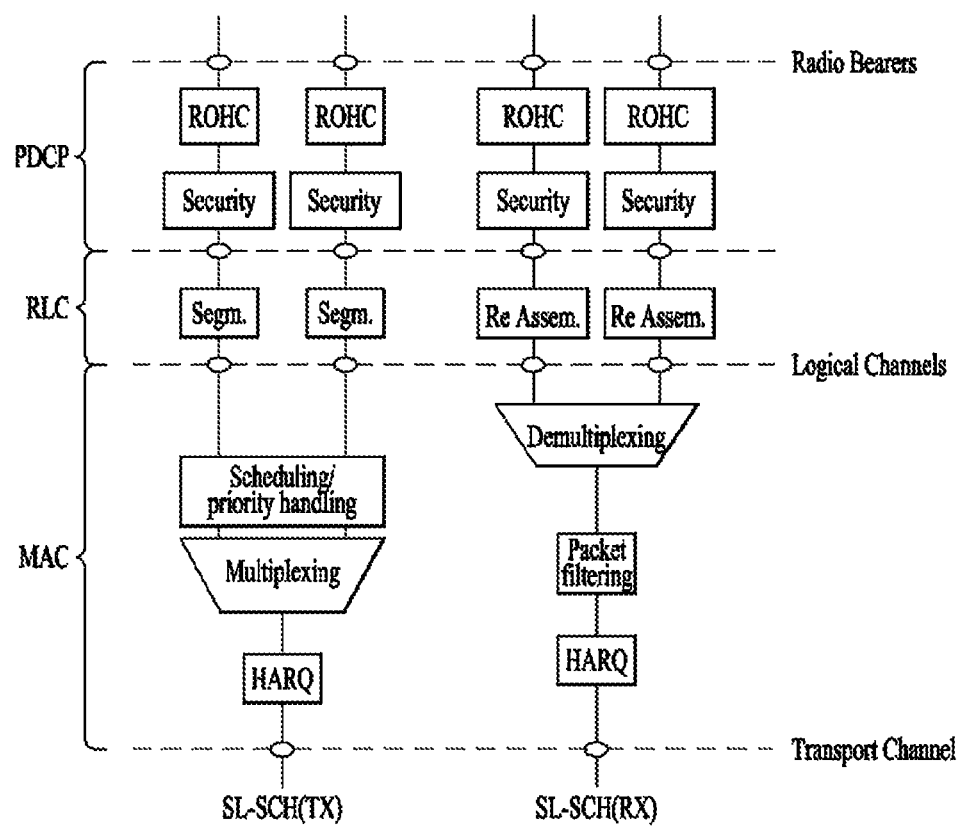
FIG. 8 is a conceptual diagram illustrating for a Layer 2 Structure for Sidelink.

FIG. 8 is a conceptual diagram illustrating for a Layer 2 structure for Sidelink. Sidelink communication is a mode of communication whereby UEs can communicate with each other directly over the PC5 interface. This communication mode is supported when the UE is served by E-UTRAN and when the UE is outside of E-UTRA coverage. Only those UEs authorized to be used for public safety operation can perform sidelink communication.

In order to perform synchronization for out of coverage operation UE(s) may act as a synchronization source by transmitting SBCCH and a synchronization signal. SBCCH carries the most essential system information needed to receive other sidelink channels and signals. SBCCH along with a synchronization signal is transmitted with a fixed periodicity of 40 ms. When the UE is in network coverage, the contents of SBCCH are derived from the parameters signalled by the eNB. When the UE is out of coverage, if the UE selects another UE as a synchronization reference, then the content of SBCCH is derived from the received SBCCH; otherwise UE uses pre-configured parameters. SIB provides the resource information for synchronization signal and SBCCH transmission. There are two pre-configured subframes every 40 ms for out of coverage operation. UE receives synchronization signal and SBCCH in one subframe and transmit synchronization signal and SBCCH on another subframe if UE becomes synchronization source based on defined criterion.

UE performs sidelink communication on subframes defined over the duration of Sidelink Control period. The sidelink Control period is the period over which resources allocated in a cell for sidelink control information and sidelink data transmissions occur. Within the sidelink Control period the UE sends sidelink control information followed by sidelink data. sidelink control information indicates a Layer 1 ID and characteristics of the transmissions (e.g. MCS, location of the resource(s) over the duration of Sidelink Control period, timing alignment).

The UE performs transmission and reception over Uu and PC5 with the following decreasing priority order:
i. Uu transmission/reception (highest priority);
ii. PC5 sidelink communication transmission/reception;
iii. PC5 sidelink discovery announcement/monitoring (lowest priority).

Figure 9A:
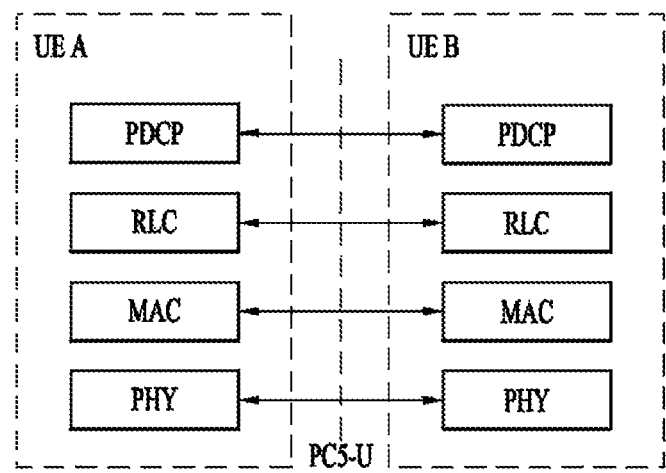
FIG. 9A is a conceptual diagram illustrating for User-Plane protocol stack for ProSe Direct Communication.
Figure 9B:
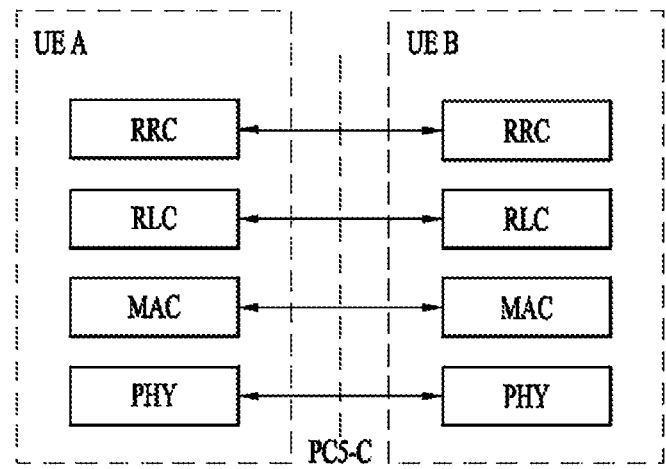
FIG. 9B is Control-Plane protocol stack for ProSe Direct Communication.

FIG. 9A is a conceptual diagram illustrating for User-Plane protocol stack for ProSe Direct Communication, and FIG. 9B is Control-Plane protocol stack for ProSe Direct Communication.

FIG. 9A shows the protocol stack for the user plane, where PDCP, RLC and MAC sublayers (terminate at the other UE) perform the functions listed for the user plane (e.g. header compression, HARQ retransmissions). The PC5 interface consists of PDCP, RLC, MAC and PHY as shown in FIG. 9A.

User plane details of ProSe Direct Communication: i) there is no HARQ feedback for sidelink communication, ii) RLC UM is used for sidelink communication, iii) RLC UM is used for sidelink communication, iv) a receiving RLC UM entity used for sidelink communication does not need to be configured prior to reception of the first RLC UMD PDU, and v) ROHC Unidirectional Mode is used for header compression in PDCP for sidelink communication.

A UE may establish multiple logical channels. LCID included within the MAC subheader uniquely identifies a logical channel within the scope of one Source Layer-2 ID and ProSe Layer-2 Group ID combination. Parameters for logical channel prioritization are not configured. The Access stratum (AS) is provided with the PPPP of protocol data unit transmitted over PC5 interface by higher layer. There is a PPPP associated with each logical channel.

SL-RNTI is an unique identification used for ProSe Direct Communication Scheduling.

The Source Layer-2 ID identifies the sender of the data in sidelink communication. The Source Layer-2 ID is 24 bits long and is used together with Destination Layer-2 ID and LCID for identification of the RLC UM entity and PDCP entity in the receiver.

The destination Layer-2 ID identifies the target of the data in sidelink communication. The Destination Layer-2 ID is 24 bits long and is split in the MAC layer into two bit strings: i) One bit string is the LSB part (8 bits) of Destination Layer-2 ID and forwarded to physical layer as Group Destination ID. This identifies the target of the intended data in sidelink control information and is used for filtering of packets at the physical layer. And ii) Second bit string is the MSB part (16 bits) of the Destination Layer-2 ID and is carried within the MAC header. This is used for filtering of packets at the MAC layer.

No Access Stratum signalling is required for group formation and to configure Source Layer-2 ID, Destination Layer-2 ID and Group Destination ID in the UE. These identities are either provided by higher layer or derived from identities provided by higher layer. In case of groupcast and broadcast, the ProSe UE ID provided by higher layer is used directly as the Source Layer-2 ID and the ProSe Layer-2 Group ID provided by higher layer is used directly as the Destination Layer-2 ID in the MAC layer. In case of one-to-one communications, higher layer provides Source Layer-2 ID and Destination Layer-2 ID.

FIG. 9B shows the protocol stack for the control plane.

A UE does not establish and maintain a logical connection to receiving UEs prior to one-to-many a sidelink communication. Higher layer establish and maintain a logical connection for one-to-one sidelink communication including ProSe UE-to-Network Relay operation.

The Access Stratum protocol stack for SBCCH in the PC5 interface consists of RRC, RLC, MAC and PHY as shown below in FIG. 9B.

There is a lot of interest to use LTE technology to connect and manage low cost Machine Type Communication (MTC) devices. One important example of such low cost devices are wearables, which also have the benefit of almost always being in close proximity to a smartphone that can serve as a relay. In order to enable D2D aided wearable and MTC applications, enhancement of UE-to-Network relaying functionality is necessary.

The UE-to-Network relaying architecture in ProSe does not differentiate the traffic of the remote UE from that of the relay UE in the access stratum. This model limits the ability of the network and the operator to treat the remote UE as a separate device, e.g. for billing or security. In particular, the 3GPP security associations never reach end-to-end between the network and the remote UE, meaning that the relay UE has clear text access to the remote UE's communications. UE-to-Network relaying should be enhanced to support end-to-end security through the relay link, service continuity, E2E QoS where possible, efficient operation with multiple remote UEs, and efficient path switching between Uu and D2D air-interfaces. Relaying using D2D can also be based on non-3GPP technologies such as Bluetooth and Wi-Fi. Some enhancements such as service continuity can make relaying more attractive for such technologies in commercial use cases. This can be especially useful to wearables due to their usage patterns with proximity to the user's smartphone, as well as form-factor limitations that may make a direct Uu connection less practical (e.g. limits on battery size). Relaying can enable significant power savings for remote UEs (that are getting their traffic relayed). This is especially true for deep coverage scenarios. One cost effective way of introduce relaying is to use unidirectional D2D links between remote devices and relay devices. In this case, the relay UE is utilised to relay only uplink data from the remote UE. The advantage of this approach is no additional RF capability for D2D reception is added to the remote UE.

There are two network connection modes. The first mode is a direct network connection mode, where there is no relay UE between a UE and a network (e.g., 5G network). In the direct network connection mode, connection between the UE and the network is made using Uu-interface. The second mode is an indirect network connection mode, where there is a relay UE between a UE and a network (e.g., 5G network). In the indirect network connection mode, a connection is made using an intermediate UE relay, which uses PC5 interface between a relay UE and a remote UE, and Uu interface between the relay UE and eNB (or gNB).

Figure 10:
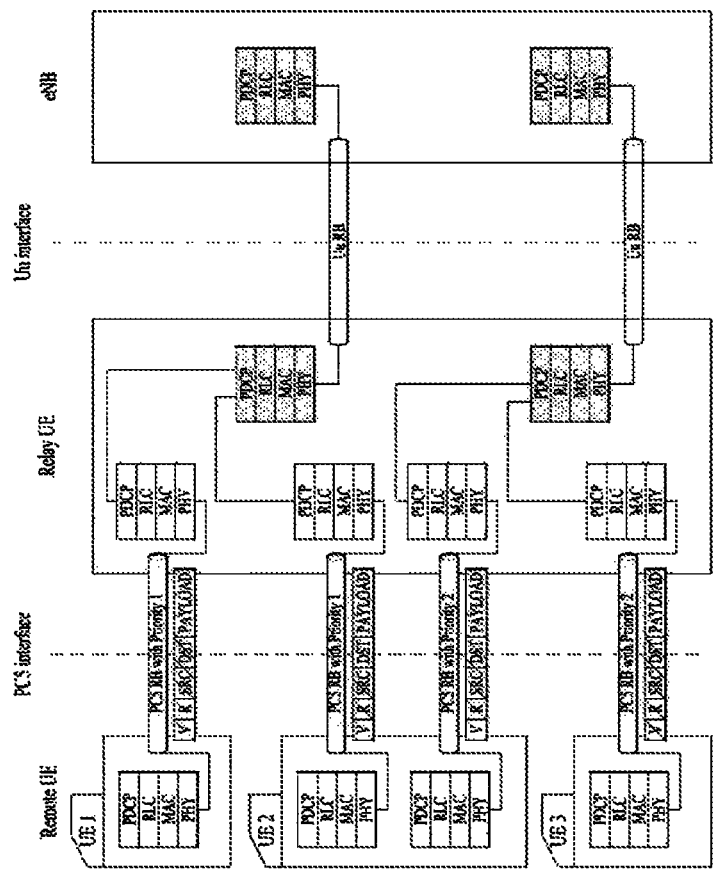
FIG. 10 is an example for PC5 interface between remote UEs and a relay UE.

FIG. 10 is an example for PC5 interface between remote UEs and a relay UE.

In ProSe, a UE communicates with other UEs directly over PC5 interface.

By introducing a Relay UE for UE-to-NW relay, a remote UE transmits data to an eNB via the Relay UE, and the eNB transmits data to the remote UE via the Relay UE. That is, the Relay UE relays data to/from eNB.

As data transfer between the remote UE and the Relay UE is ProSe communication, the Relay UE is communicating with the remote UE over PC5 interface. In the meantime, as data transfer between the Relay UE and the eNB is a normal uplink/downlink (Uu) communication, the Relay UE is communicating with the eNB over Uu interface. This implies that if data has higher priority in PC5 communication, it should also be higher prioritized in Uu communication.

Over PC5 interface, Per-Packet Priority (PPP), is used to prioritize a certain packet, where the priority is independent with ProSe destination or ProSe UE. In order to prioritize the packet with higher priority over Uu interface as well, the Relay UE needs to know the priority of the packet so that the Relay UE provides more opportunities of transmission to the packet with higher priority.

In order to transmit on the SL-SCH, the MAC entity must have a sidelink grant. The sidelink grant is selected as follows: if the MAC entity is configured to receive a sidelink grant dynamically on the PDCCH and more data is available in STCH than can be transmitted in the current SC period, the MAC entity shall determine a set of subframes in which transmission of SCI and transmission of first transport block occur using the received sidelink grant, consider the received sidelink grant to be a configured sidelink grant occurring in those subframes starting at the beginning of the first available SC Period which starts at least 4 subframes after the subframe in which the sidelink grant was received, overwriting a previously configured sidelink grant occurring in the same SC period, if available, and clear the configured sidelink grant at the end of the corresponding SC Period.

If the MAC entity has a configured sidelink grant occurring in this subframe, and if the configured sidelink grant corresponds to transmission of SCI, the MAC entity shall, for each subframe, instruct the physical layer to transmit SCI corresponding to the configured sidelink grant.

If the MAC entity has a configured sidelink grant occurring in this subframe, and if the configured sidelink grant corresponds to transmission of first transport block, the MAC entity shall deliver the configured sidelink grant and the associated HARQ information to the Sidelink HARQ Entity for this subframe.

For PDU(s) associated with one SCI, MAC shall consider only logical channels with same Source Layer-2 ID-Destination Layer-2 ID pairs.

Figure 11:
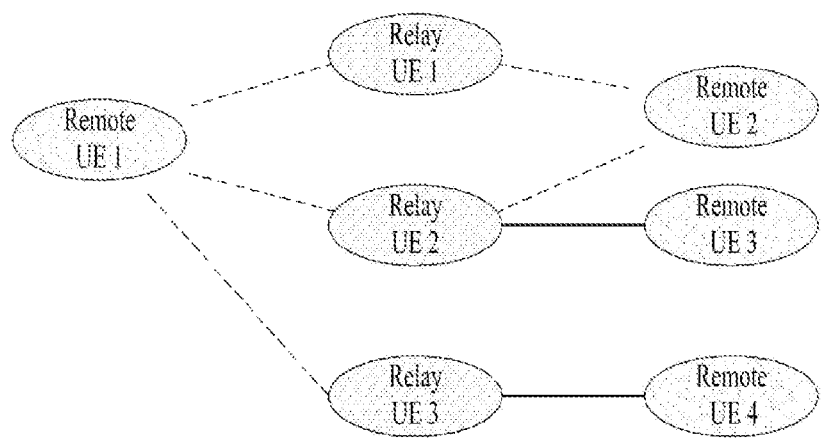
FIG. 11 shows an example of UE-to-Network relaying.

FIG. 11 shows an example of UE-to-Network relaying. In FIG. 11, a relay UE has available Uu-interface (e.g. to eNB or to gNB), and a remote UE is able to make an indirect network connection through the relay UE. Multiple remote UEs can be connected to a network via a relay UE. It is assumed that remote UEs can support both Wide Area Network (WAN) and D2D connection, and that remote UEs may have 3GPP subscription credentials. The D2D connection is realized by either LTE sidelink or non-3GPP technology (e.g., Bluetooth/WiFi). All non-3GPP technologies can be considered transparent for generic relay architecture over them. The following coverage scenarios are supported: (i) a remote UE and a relay UE are EUTRAN in-converage, (ii) a relay has a Uu connection to a network (e.g., eNB or gNB) and a remote UE can be in enhanced coverage (enhanced coverage implies that the remote UE is connecting to the network via Narrow Band Internet of Things (NB-IoT) or 3GPP Rel-13 MTC in CE mode, and (iii) a relay UE is in EUTRAN coverage and a remote UE is out of coverage of EUTRAN.

As shown in FIG. 11, a plurality of relay UEs may be located in a proximity of a remote UE. In this case, the remote UE may have to select one of the plurality of relay UEs. Here, the plurality of relay UEs that can serve a remote UE is referred to candidate relay UEs (dotted line) for the remote UE. For example, Remote UE1 has three candidate relay UEs, i.e., Relay UE1~UE3, and may select one of the Relay UE1~UE3. Remote UE3 has a connection with Relay UE2 (solid line), and Relay UE2 may be a relay UE selected from two candidate relay UEs, e.g., Relay UE1 and UE2. Thus, if there are a plurality of candidate relay UEs, a remote UE has multiple options for selecting a relay UE from the plurality of candidate relay UEs.

In a conventional UE-to-Network relaying architecture, a Remote UE selects a Relay UE merely based on, for example, a signal strength of a sidelink. This may cause a situation where a lot of Remote UEs want to select and connect to the same Relay UE, even though a sidelink air-interface should be optimized for energy efficient communication. To address the problem, the present invention provides a power efficient method for a remote UE (e.g., wearable device) to select a relay UE. In particular, the present invention provides a relay UE selection method using a battery condition and/or history information.

Figure 12:
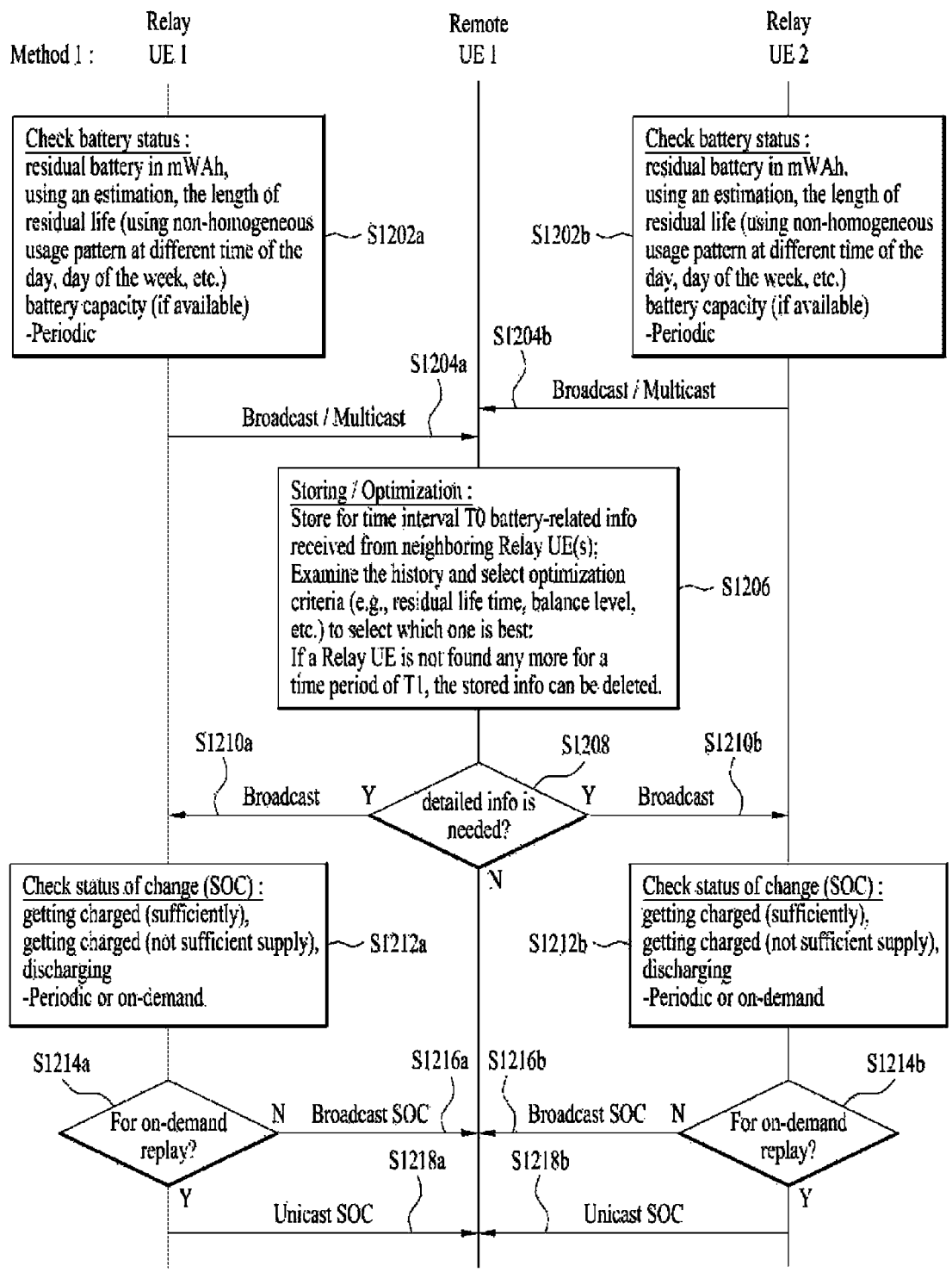
FIGS. 12-14 illustrate relay selection methods in accordance with examples of the present invention.

FIG. 12 shows a relay selection method according to an example of the present invention.

Referring to FIG. 12, Relay UE(s) (e.g., Relay UE1, Relay UE2) may check its battery status (S1202*a*, S1202*b*). The battery status may include at least one of: a residual battery power (e.g., mWAh or %), an estimated length of residual battery life (using non-homogeneous usage pattern at different time of a day, day of a week, etc.) and a battery capacity (if available). The battery status can be periodically checked, and battery-related information (e.g., a residual battery power, a length of residual battery life, and/or a battery capacity) can be broadcast or multicast to neighboring Remote UE(s) (S1204*a*, S1204*b*). Upon receipt of battery-related information from neighboring Relay UE(s), Remote UE1 may store and optimize the battery-related information received from neighboring Relay UE(s) (S1206). In order to monitor a history of battery status, battery-related information of each Relay UE can be separately stored at least for a time interval T0. The time interval T0 can be configured/pre-defined to be larger (e.g., X times of the period, X>1) than a period in with the battery-related information is periodically received. Meanwhile, if a Relay UE (e.g., Relay UE1) is not found any more for a time interval T1 (e.g., T1>T0), the stored battery-related information of the Relay UE can be deleted.

Remote UE1 may examine histories of the stored battery status, and then select which Relay UE is best among neighboring Relay UE(s), based on a selected/configured/pre-defined optimization criteria (e.g., residual battery life time, balance level. etc.). After the step of S1206, Remote UE1 may determine whether it needs more detailed information (S1208). If Remote UE1 needs more detailed information, Remote UE1 may broadcast a signal that requests further detailed information about the battery status of Relay UEs (S1210*a*, S1210*b*). For example, when congested, (even though the stored information is substantially similar between Relay UE(s), (e.g., difference between the stored information is less than a threshold value)), Remote UE(s) are supposed to make a precise decision so that it can avoid causing the overall system performance (e.g., throughput) (affected by the expected topology) to be degrade (e.g., by making a wrong decision); when not congested, (even though the stored information is substantially different between Relay UE(s), (e.g., difference between the stored information is no less than the threshold value)) Remote UE can make a simple decision based on the stored information (e.g., batter status) without having to go through requesting detailed information to Relay UE(s). Here, whether congested or not can be can be determined using a congestion level in a system information block received from a Relay UE, or a channel sensing. For example, when the signaled congestion level is higher than a threshold value, Remote UE may determine that Relay UE(s) are congested. Also, when the number of busy channels is exceeds p % (e.g., p is a value larger than 60) of the total number of available channel during the time interval T0, emote UE may determine that Relay UE(s) are congested.

Meanwhile, if Remote UE1 does not need more detailed information, Remote UE1 may select one of neighboring Relay UE(s) based on the stored battery-related information within the recent T0 time period, and and then connect to the selected Relay UE.

Upon the receipt of the request, each Relay UE may check a status of change (SOC) (S1212a, S1212b). The SOC may may include one of three status: (i) getting charged (sufficiently), (ii) getting charged (but, not sufficient supply), and (iii) discharging. The SOC can be checked periodically or on-demand. If the SOC is checked periodically (i.e., non on demand) (S1214a, S1214b), Relay UE(s) may broadcast the SOC-related information to neighboring Remote UE(s) (S1216a, S1216b). Meanwhile, if the SOC is checked by a request from Remote UE1 (i.e., on demand) (S1214a, S1214b), Relay UE(s) may unicast the SOC-related information to Remote UE1 (S1218a, S1218b). Based on the stored battery-related information and the stored SOC-related information within the recent T0 time period, Remote UE1 may select and connect to one of neighboring Relay UE(s).

In reality, a Remote UE can receive battery-related information from more than one Relay UE. In that case, battery-related information received from one Relay UE is comparable to battery-related information received from a second (or third, and so on) Relay UE. Examples can include a case that:

Case 1:
Relay UE1 sent out battery-related information to neighboring Remote UE(s) (via broadcast or multicast, etc.):
  Residual battery life: 2 hours (expected)
  Charging status: none
  Battery drainage speed: fast level, and
  Battery charging speed: not available
And, Relay UE2 also sent out battery-related information to neighboring Relay UEs:
  Residual battery life: 1.8 hours (expected)
  Charging status: none
  Battery drainage speed: fast level, and
  Battery charging speed: not available
Remote UE (of our interested in this case example) (e.g., Remote UE1) has received both battery-related information from Relay UE1 and UE2. In this case, Remote UE1 can decide that the battery-related information does not have much difference if the difference threshold value for residual battery life is set 0.5 hours. In this case, some additional consideration might be necessary and useful if Remote UE1 can smartly select which Relay UE to contact for connection opportunity. If Remote UE1 needs more detailed information, Remote UE1 may request further detailed information about battery status to neighboring Relay UE(s). Otherwise, Remote UE1 may make a simple decision. For example, a Relay UE is selected randomly from Relay UE1 and Relay UE2, or merely based on residual battery life.

Case 2:
Relay UE1 sent out battery-related information to neighboring Remote UE(s) (via broadcast or multicast, etc.):
  Residual battery life: 3 hours (expected)
  Charging status: none
  Battery drainage speed: slow level, and
  Battery charging speed: not available
And, Relay UE2 also sent out battery-related information to neighboring Remote UE(s):
  Residual battery life: 2 hours (expected)
  Charging status: being charged
  Battery drainage speed: none, and
  Battery charging speed: fast level
Remote UE (of our interested in this case example) (e.g., Remote UE1) has received both battery-related information from Relay UE1 and UE2. In this case, Remote UE1 can decide that the battery-related information have difference over the pre-set threshold value of 0.5 hour (as in Case 1), but Relay UE2 is being charged and known to be charged fast. Therefore, Remote UE1 may need to decide which Relay UE to choose in consideration of what's going to be happen in the near future (e.g., 5 min, 10 min later depending on the expected traffic demand from this Remote UE). As a result, Remote UE1 may choose and contact Relay UE2, and make a contact for connection opportunity.

Figure 13:
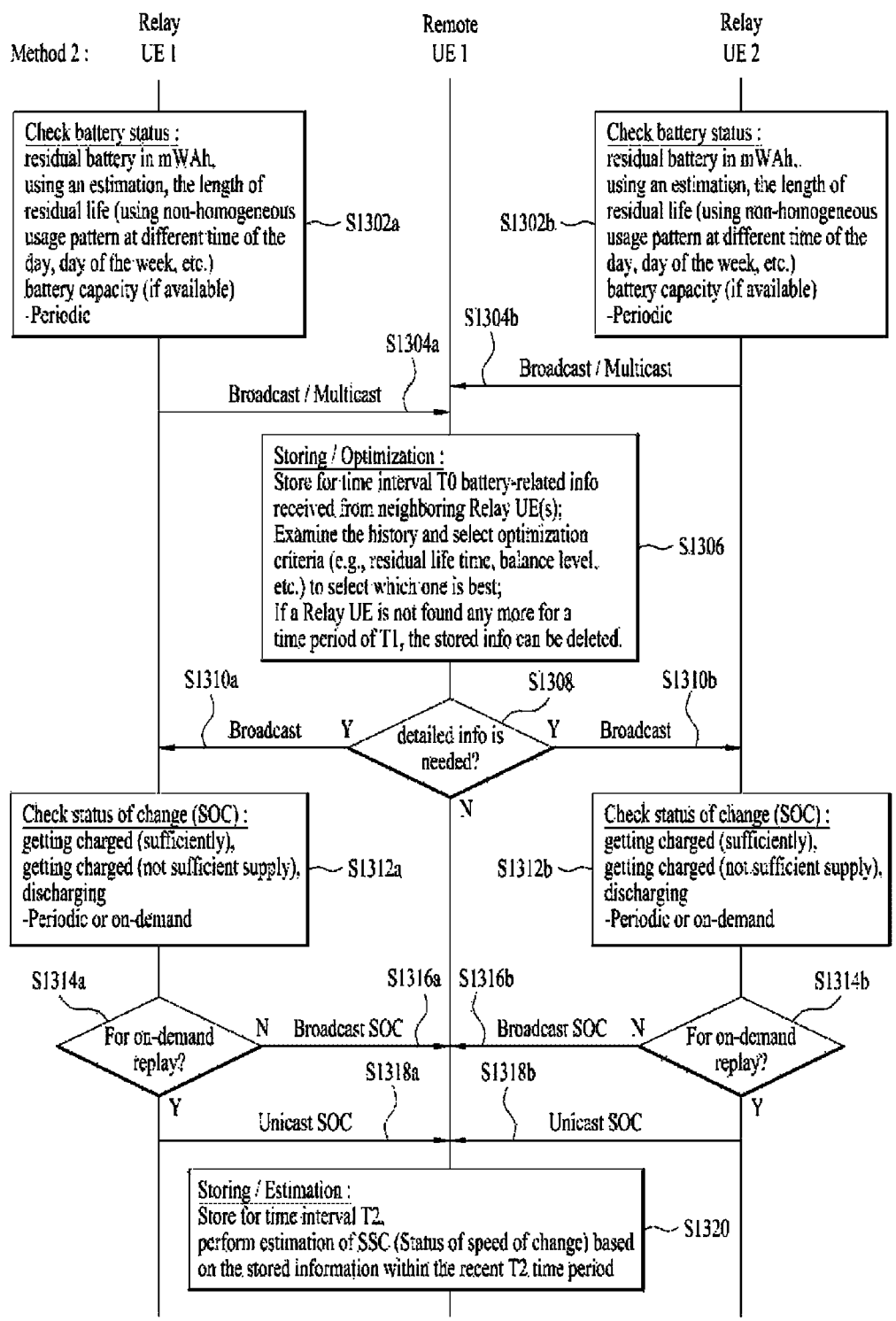

FIG. 13 shows a relay selection method according to another example of the present invention. The procedure of FIG. 13 is basically same as FIG. 12, except that the step S1320 is added. Detailed explanations on the steps of S1302~S1318 can be referred to explanations of the step of S1202~S1218 of FIG. 12, respectively.

Referring to FIG. 13, after performed the steps of S1302~S1318, Remote UE may store SOC received from neighboring Relay UE(s) at least for a time interval T2 (e.g., T2=m*T0, m is an integer of 1 or more), and estimate Status of Speed of Change (SSC) based on the stored information within the recent T2 time period (S1320). More specifically, if Remote UE1 received ""n"" tuples of data (e.g., SOC), x[0], x[1], . . . , x[n−1], during a time internal T2, Remote UE1 stores the ""n"" tuples of data. Here, ""n"" is the number of accumulated tuples, and x[i] is the i-th vector of order ""p"" from the beginning of the time interval T2, which include a certain number of data elements). In this case, SSC is used to represent how fast the data changes during the time interval T2 (e.g., T2=m*T0, m is an integer of 1 or more). Specifically, SSC may indicate the rate/speed of getting charged (sufficiently), the rate/speed of getting charged (not sufficiently supply) or the rate/speed of discharging during the time interval T2. For example, SSC may be performed based on a first derivative value of the data during the time interval T2.

Figure 14:
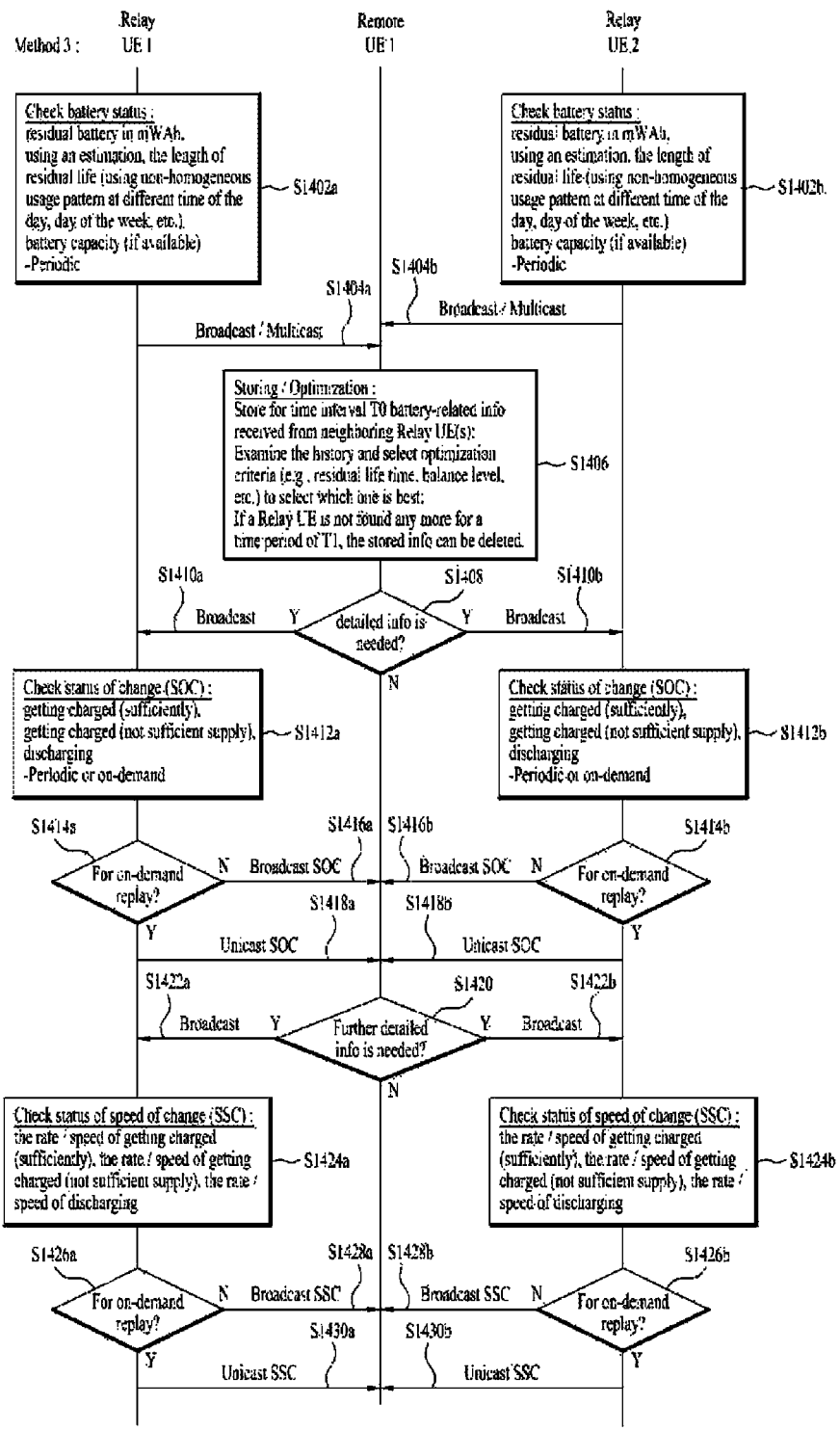

FIG. 14 shows a relay selection method according to another example of the present invention. The procedure of FIG. 14 is basically same as FIG. 12, except that the steps S1420~S1430 are added. Detailed explanations on the steps of S1402~S1418 can be referred to explanations of the step of S1202~S1218 of FIG. 12, respectively.

Referring to FIG. 14, after performed the steps of S1402~S1418, Remote UE may decide whether further detailed information is needed (S1420). If Remote UE1 needs more detailed information, Remote UE1 may broadcast a signal that requests further detailed information about the battery status of Relay UEs (S1422a, S1422b). Here, the request of the step of S1422a, S1422b may be distinguished from the request of the step of S1410a, S1410b based on scrambling sequences initialized with different common identifiers (e.g., RNTIs). Accordingly, Relay UE may perform different operations based on which common identifier is used to scrambling sequence for the received request.

For example, if there is no substantial difference in the stored information (e.g., battery status, SOC) (e.g., difference between battery status (e.g., residual battery life) of Relay UE(s) is less than a threshold value, and/or SOCs of Relay UE(s) have the same information (e.g., getting charged or discharged), Remote UE(s) are supposed to make a precise decision so that it can avoid causing the overall system performance (e.g., throughput) (affected by the expected topology) to be degrade (e.g., by making a wrong decision); otherwise, Remote UE can make a simple decision based on the stored information without having to go through requesting detailed information to Relay UE(s). For example, if Remote UE1 does not need more detailed information, Remote UE1 may select one of neighboring Relay UE(s) based on the stored battery-related information and the stored SOC-related information within the recent T0 time period, and and then connect to the selected Relay UE.

Upon the receipt of the request, each Relay UE may check a status of speed of change (SSC) (S1424a, S1424b). SSC is used to represent how fast the data changes during the time interval T2 (e.g., T2=m*T0, m is an integer of 1 or more). For example, SSC indicate the rate/speed of getting charged (sufficiently), the rate/speed of getting charged (not sufficiently supply) or the rate/speed of discharging. The SSC can be checked periodically or on-demand. If the SSC is checked periodically (i.e., non on demand) (S1426a, S1426b), Relay UE(s) may broadcast the SSC-related information to neighboring Remote UE(s) (S1428a, S1428b). Meanwhile, if the SSC is checked by a request from Remote UE1 (i.e., on demand) (S1426a, S1426b), Relay UE(s) may unicast the SSC-related information to Remote UE1 (S1430a, S1430b). Based on the stored information (e.g., battery status, SOC and SSC) within the recent T0 time period, Remote UE1 may select and connect to one of neighboring Relay UE(s).

Figure 15:
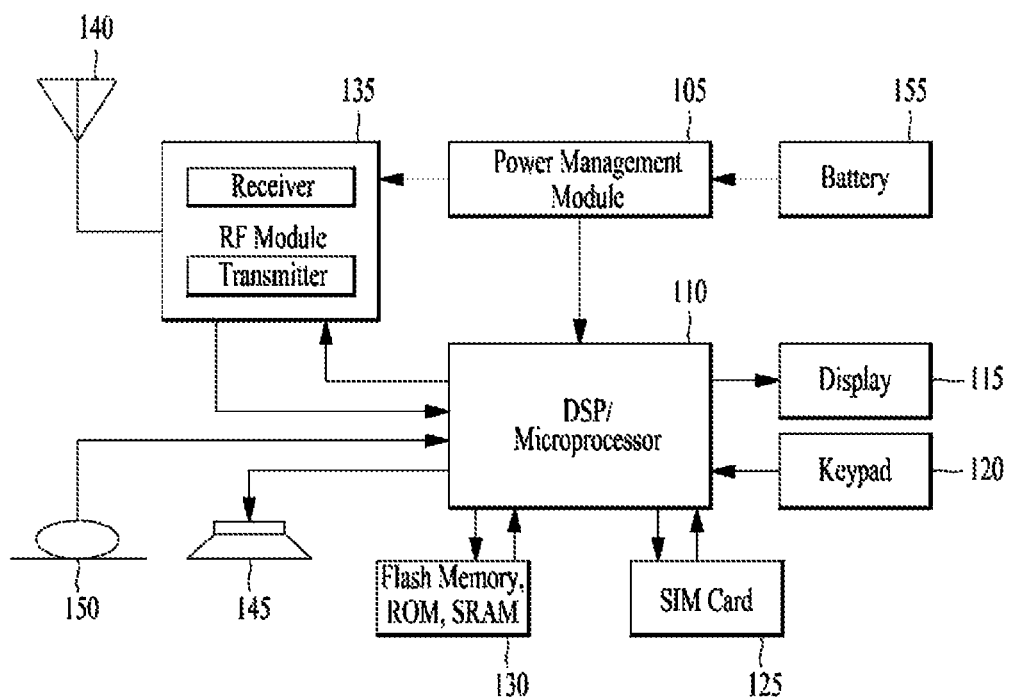
FIG. 15 illustrates a block diagram of a User Equipment (UE).

FIG. 15 illustrates a block diagram of a UE or Mobile Station (MS) 10. The UE 10 includes a MTC device or a delay-tolerant device. The UE 10 includes a processor (or digital signal processor) 510, RF module 535, power management module 505, antenna 540, battery 555, display 515, keypad 520, memory 530, SIM card 525 (which may be optional), speaker 545 and microphone 550.

A user enters instructional information, such as a telephone number, for example, by pushing the buttons of a keypad 520 or by voice activation using the microphone 550. The microprocessor 510 receives and processes the instructional information to perform the appropriate function, such as to dial the telephone number. Operational data may be retrieved from the Subscriber Identity Module (SIM) card 525 or the memory module 530 to perform the function. Furthermore, the processor 510 may display the instructional and operational information on the display 515 for the user's reference and convenience.

The processor 510 issues instructional information to the RF module 535, to initiate communication, for example, transmits radio signals comprising voice communication data. The RF module 535 comprises a receiver and a transmitter to receive and transmit radio signals. An antenna 540 facilitates the transmission and reception of radio signals. Upon receiving radio signals, the RF module 535 may forward and convert the signals to baseband frequency for processing by the processor 510. The processed signals would be transformed into audible or readable information outputted via the speaker 545, for example. The processor 510 also includes the protocols and functions necessary to perform the various processes described herein.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments of the present invention have been described based on data transmission and reception between a BS (or eNB) and a UE. A specific operation which has been described as being performed by the eNB (or BS) may be performed by an upper node of the BS (or eNB) as the case may be. In other words, it will be apparent that various operations performed for communication with the UE in the network which includes a plurality of network nodes along with the BS (or eNB) can be performed by the BS or network nodes other than the BS (or eNB). The BS may be replaced with terms such as fixed station, Node B, eNode B (eNB), and access point. Also, the term UE may be replaced with terms such as mobile station (MS) and mobile subscriber station (MSS).

The embodiments according to the present invention can be implemented by various means, for example, hardware, firmware, software, or combinations thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations as described above. Software code may be stored in a memory unit and then may be driven by a processor. The memory unit may be located inside or outside the processor to transmit and receive data to and from the processor through various well known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to a method and an apparatuses for a proximity-based service, specifically, a proximity-based service for public safety.

What is claimed is:

1. A method for a User Equipment (UE) to select a Relay UE in a cellular communication system, the method comprising:
   receiving a plurality of first battery status information from a plurality of Relay UEs,
   wherein each first battery status information includes an estimated time length of residual battery life of a respective Relay UE;
   if a congestion is recognized, transmitting a first request signal for requesting additional information about battery status to the plurality of Relay UEs;
   as a response to the first request signal, receiving a plurality of second battery status information from the plurality of Relay UEs,
   wherein each second battery status information includes a charging status of the respective Relay UE;
   transmitting a second request signal for requesting additional information about battery status to the plurality of Relay UEs;
   as a response to the second request signal, receiving a plurality of third battery status information from the plurality of Relay UEs,
   wherein each third battery status information includes a change of speed of charging status of the respective Relay UE; and
   selecting one of the plurality of Relay UEs based on the first to third battery status information,
   wherein the first request signal and the second request signals are distinguished using scrambling sequences initialized with different common identifier.

2. The method of claim 1, wherein the congestion is recognized if a congestion level received from system information is higher than a threshold value.

3. The method of claim 1, wherein the congestion is recognized if a number of busy channels monitored in a time interval exceeds p % of a total number of channel in the time interval, and p is a pre-determined value.

4. The method of claim 1, wherein if the congestion is not recognized, the one of the plurality of Relay UEs is selected only based on the first battery status information, without requesting the additional information about battery status to the plurality of Relay UEs.

5. A User Equipment (UE) configured to select a Relay UE in a wireless communication system, the UE comprising:
   a radio frequency (RF) unit; and
   a processor, wherein the processor is configured to:
   receive a plurality of first battery status information from a plurality of Relay UEs,
   wherein each first battery status information includes an estimated time length of residual battery life of the respective Relay UE,
   if a congestion is recognized, transmit a first request signal for requesting additional information about battery status to the plurality of Relay UEs,
   as a response to the first request signal, receive a plurality of second battery status information from the plurality of Relay UEs,
   wherein each second battery status information includes a charging status of a respective Relay UE,
   transmit a second request signal for requesting additional information about battery status to the plurality of Relay UEs,
   as a response to the second request signal, receive a plurality of third battery status information from the plurality of Relay UEs,
   wherein each third battery status information includes a change of speed of charging status of the respective Relay UE, and
   select one of the plurality of Relay UEs based on the first to third battery status information,
   wherein the first request signal and the second request signals are distinguished using scrambling sequences initialized with different common identifier.

6. The UE of claim 5, wherein the congestion is recognized if a congestion level received from system information is higher than a threshold value.

7. The UE of claim 5, wherein the congestion is recognized if a number of busy channels monitored in a time interval exceeds p % of a total number of channel in the time interval, and p is a pre-determined value.

8. The UE of claim 5, wherein if the congestion is not recognized, the one of the plurality of Relay UEs is selected only based on the first battery status information, without requesting the additional information about battery status to the plurality of Relay UEs.

9. The UE of claim 5, wherein the UE is capable of communicating with at least one of another UE, a UE related to an autonomous driving vehicle, a base station or a network.

* * * * *